United States Patent [19]

Coley

[11] 4,369,766

[45] Jan. 25, 1983

[54] SOLAR HEATING AND SHADING WINDOW HAVING AUTOMATIC TEMPERATURE-RESPONSIVE DAMPER SYSTEM

[76] Inventor: John L. Coley, 1147 Nance Dr., Madison, Ala. 35758

[21] Appl. No.: 113,955

[22] Filed: Jan. 21, 1980

[51] Int. Cl.³ .............................................. F24J 3/02
[52] U.S. Cl. .................................. 126/429; 126/422; 126/450; 236/49
[58] Field of Search ................ 126/422, 449, 428–431, 126/450, 444, 445; 98/88 R, 96, 95; 236/49, 99 E, 100

[56] References Cited

U.S. PATENT DOCUMENTS

| | | | |
|---|---|---|---|
| 3,875,925 | 4/1975 | Johnston | 126/429 |
| 3,990,635 | 11/1976 | Restle et al. | 126/422 |
| 4,072,141 | 2/1978 | Fillios et al. | 126/422 |
| 4,091,863 | 5/1978 | Schroder | 126/400 |
| 4,155,504 | 5/1979 | Caldwell | 236/99 E |
| 4,237,865 | 12/1980 | Lorenz | 126/422 |

OTHER PUBLICATIONS

N. Fuschillo, "Semi-Transparent Solar Collector Window Systems", Solar Energy, vol. 17, pp. 159–165, Pergamon Press, (1975).

Primary Examiner—James C. Yeung
Attorney, Agent, or Firm—Brady, O'Boyle & Gates

[57] ABSTRACT

Spaced exterior and interior windows define a solar plenum having communication with one isolated chamber of an adjacent dual chamber bay, the second chamber of which is in communication with the outside ambient or the inside building space air. Dampers for the solar plenum are automatically operated by thermally sensitive devices in the two isolated bay chambers, one of the devices controlling the direction of damper movement and the other device controlling damper actuation. The two dampers can completely close the solar plenum or vent it to the outside ambient for dissipating heat or to an interior space requiring solar heating. A solar screen in the plenum increases the thermal efficiency of the window arrangement. In a modified form, only one thermally sensitive device is provided which is in communication with the solar plenum and is connected to operate the two dampers to either completely close the solar plenum or vent it to the outside.

13 Claims, 7 Drawing Figures

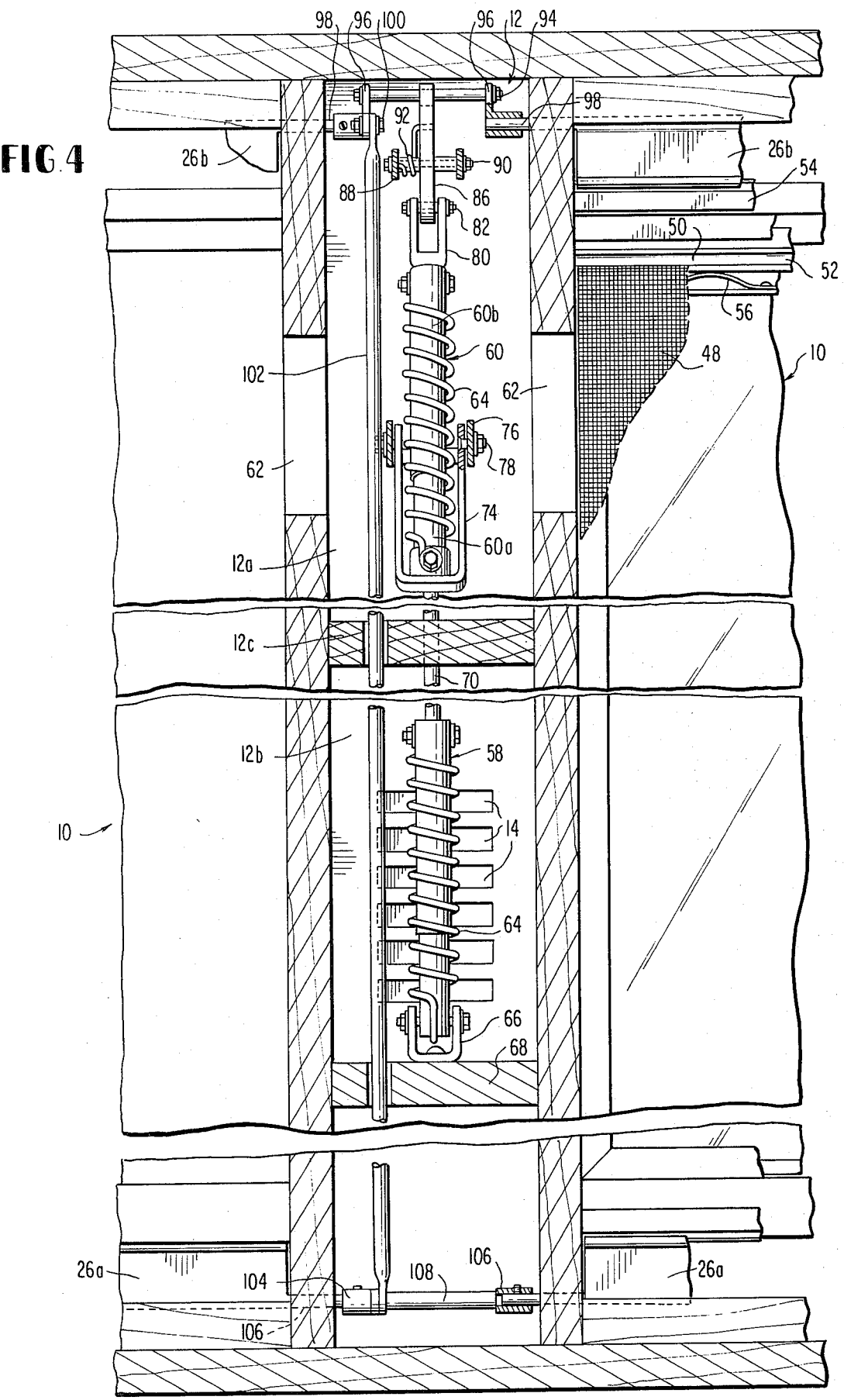

SOLAR HEATING AND SHADING WINDOW HAVING AUTOMATIC TEMPERATURE-RESPONSIVE DAMPER SYSTEM

BACKGROUND OF THE INVENTION

Various multi-pane primary window structures and storm window arrangements based on the thermal insulation achieved from a dead air space or spaces are known in the prior art. Prior U.S. Pat. No. 3,925,945 discloses the concept of venting a dead air space in a window unit to the ambient atmosphere during the summer and to an interior building space during winter. Such venting in the prior patent is accomplished by bodily pivoting or reversing the entire window frame in its opening in a building wall.

The present invention seeks to greatly improve on the known prior art by providing in a window of any necessary size or in a plurality of windows an automatic temperature-responsive damper system which under certain conditions will close and seal a solar plenum formed in each window unit between the spaced window panels thereof; and under other conditions will vent the plenum to the outside ambient atmosphere to dissipate heat, as in the summertime, or will vent the plenum to an inside room or building space to heat the latter by natural convection or by forced draft means, in some cases.

Various types of solar screens associated with windows are also known in the prior art. Such screens have the ability to intercept and absorb up to sixty percent of the sun's ray energy falling on a window. During summer, these solar screens create a serious problem in the dissipation of the heat energy absorbed by the solar screen or trapped between it and an adjacent glass pane or panel. During the winter, this same useful heat energy is wasted in known prior art devices.

Accordingly, a further important objective of this invention is to utilize a solar screen in conjunction with the window structure and its automatic damper system in such a way that the solar energy absorbed by the screen during summer will be efficiently dissipated without excessively heating the interior building space, and during the winter will not be wasted but rather will be utilized as part of a convection system to supplement the heating of an interior building space.

In its essential elements, the present invention comprises a window which can serve as a solar heater, passive or active, a solar screen and a storm window. The invention may be embodied in many different types of windows, small or large, as well as in floor-to-ceiling glass panels commonly found in large buildings.

In summer, the window unit acts as a solar screen rejecting the sun's energy to the outside. During the night, the window like any multi-panel type having a dead air space minimizes loss of interior cooling.

In winter, the window unit serves as a solar heater of interior building spaces, and during the night acts as a storm window minimizing conduction and radiation of heat to the outside.

Other features and advantages of the invention will become apparent during the course of the following description.

BRIEF DESCRIPTION OF THE DRAWINGS

FIG. 4 is a fragmentary vertical section taken on line 4—4 of FIG. 3 in a plane at right angles to the planes of FIGS. 2 and 3.

DETAILED DESCRIPTION

Figure 1:
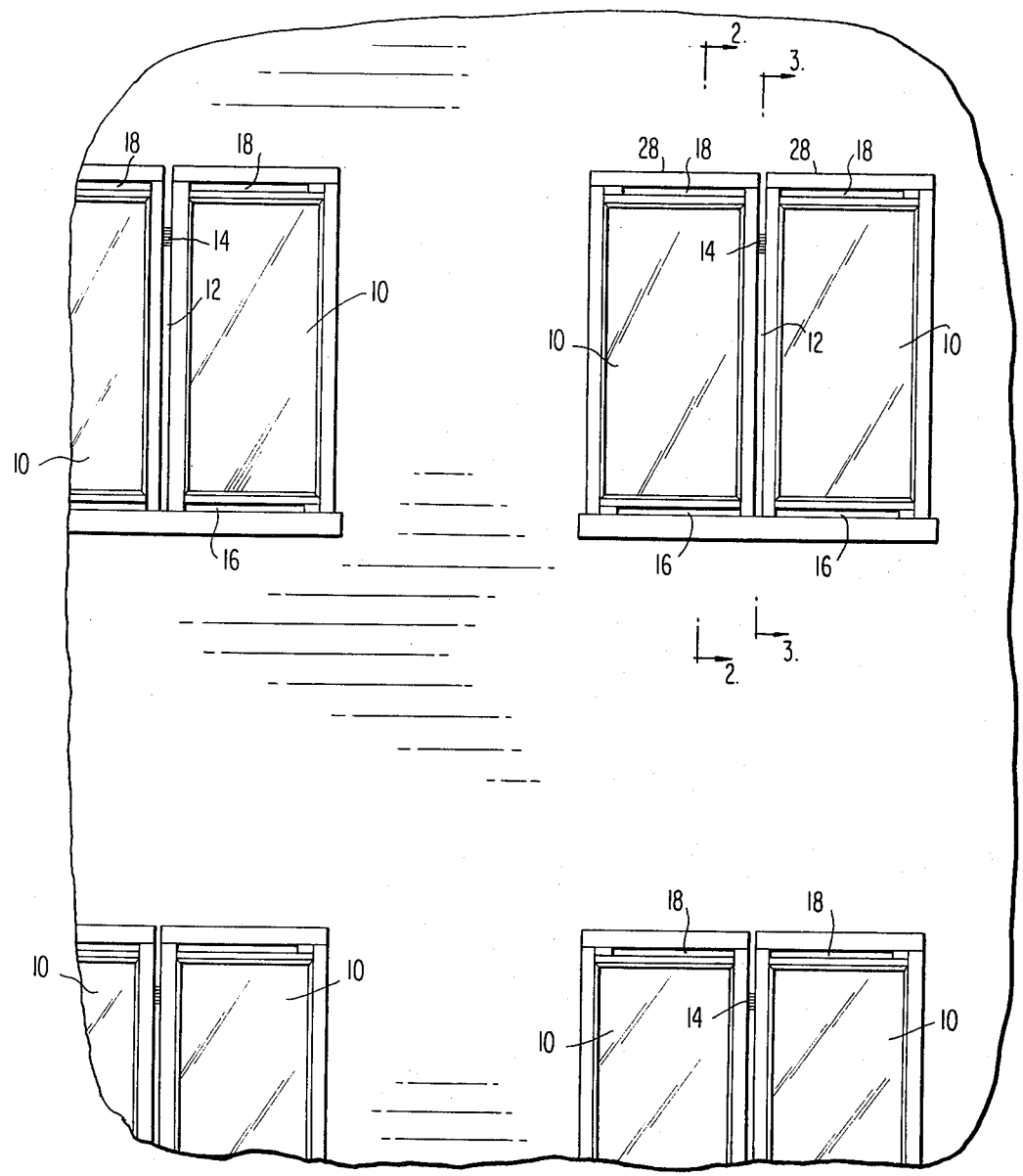
FIG. 1 is a fragmentary elevational view of a building equipped with windows embodying the present invention.
Figure 3:
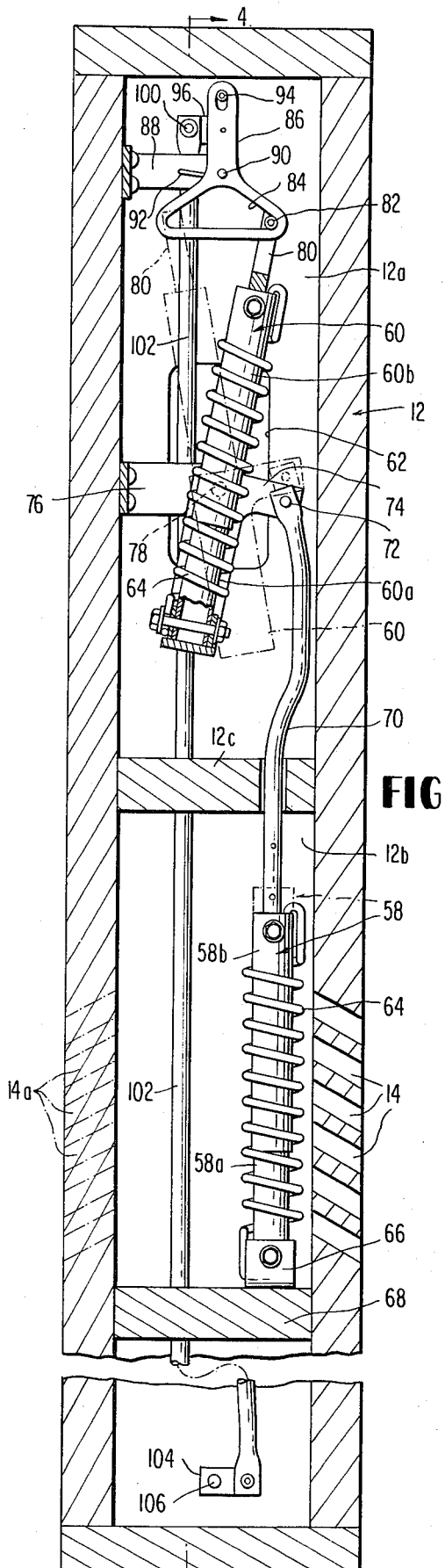
FIG. 3 is a similar section taken through a bay between adjacent window units on line 3—3 of FIG. 1.

Referring to the drawings in detail, wherein like numerals designate like parts, the numeral 10 in FIG. 1 designates typical paired side-by-side window units in accordance with the invention separated by a bay 12 having a pair of isolated chambers 12a and 12b separated by a divider wall 12c, FIGS. 3 and 4. The chamber 12b of the bay 12 is vented to the outside ambient through louver slots 14, or in certain installations through louver slots 14a to inside building space temperature. Each window unit 10 at its bottom and top is provided with an outside air inlet 16, or slot, and an air outlet 18, to be further discussed.

Figure 2:
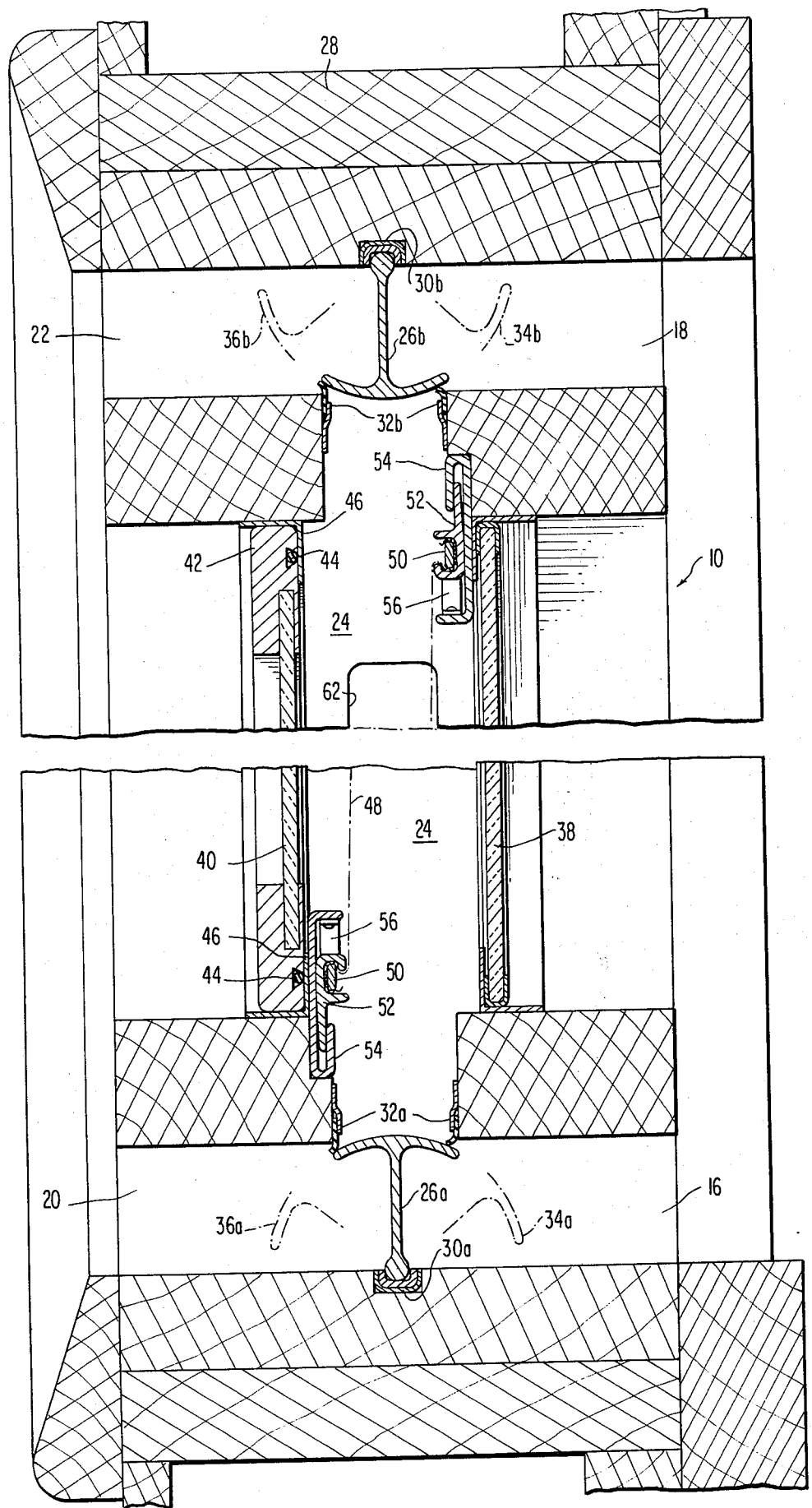
FIG. 2 is a fragmentary vertical section through one window unit taken on line 2—2 of FIG. 1.

As shown in FIG. 2, each window unit 10 also possesses at its bottom and top an inside air inlet 20 and an air outlet 22 at the elevations of the inlet and outlet 16 and 18. In the operation of each window unit, to be fully described, air flow from the outside or from the inside through a solar plenum 24 and returning to the outside or inside is regulated by dampers 26a and 26b of modified T cross section. Leakage around these dampers at the bottom and top of each window frame 28 is prevented by channel seals 30a and 30b, FIG. 2. Leakage between the solar plenum 24 and dampers 26a and 26b is prevented by pairs of strip seals 32a and 32b at the bottom and top of the plenum where it can communicate either with the passages 16 and 18, or the passages 20 and 22, under certain conditions. In FIG. 2, the dampers 26a and 26b are shown in their middle positions completely closing the solar plenum 24 to create a dead air space. In phantom lines in FIG. 2, the dampers are shown positioned at 34a and 34b to allow interior air to enter the plenum 24 from inlet 20 and to leave the plenum through outlet 22. Similarly, at 36a and 36b, the dampers are positioned to allow outside air to enter the plenum 24 through inlet 16 and to leave the plenum and return to the outside through outlet 18. At no time do the dampers 26a and 26b allow outside air to flow to the inside building space through the plenum or directly through passages 18–22 or 16–20. In the operation of the invention, the dampers 26a and 26b move in unison under control of thermally sensitive means, to be described.

The solar plenum or spaces 24 is defined by an outside storm window panel 38 fixed in the window frame and conventionally sealed and by a removable inside window panel 40 having an integrated frame 42 equipped with a seal 44 which abuts a fixed angle member 46 on the window frame. Removal of the inside window panel 40 allows cleaning of the interior of the outside panel 38, cleaning of the panel 40 and cleaning and servicing of a solar screen 48 within the plenum 24.

The solar screen 48 per se is conventional, being formed of black fiberglass mesh or the like. It extends diagonally across the plenum 24 from the upper outside corner thereof to the lower inside corner of the plenum, FIG. 2. The solar screen 48 is retained by splines 50 within a pair of spline retainer rails 52 held removably in sill mounts 54 under the biasing influence of leaf srings 56.

As shown in FIGS. 3 and 4, the bay 12 between window units 10 houses the thermally sensitive mechanism which controls the positioning of the dampers 26a and 26b. Referring to these figures, this mechanism comprises within the isolated bay chamber 12b a damper directional control cylinder 58 exposed to the ambient outside atmosphere through the louver slots 14, or in certain installations exposed to inside building air space ambient through the lower slots 14a, shown in dotted lines in FIG. 3, and within the chamber 12a a damper actuating cylinder 60 exposed to air in the plenum 24 through an opening 62 in the bay chamber side wall for this purpose. The two cylinders 58 and 60 contain thermally sensitive material causing two telescoping sections 58a-58b and 60a-60b of each cylinder to expand axially in response to a temperature increase. Surrounding retractile springs 64 on the two cylinders bias them to retracted positions shown in full lines in FIGS. 3 and 4. In such retracted positions, the dampers 26a and 26b are in their immediate closed positions relative to the plenum 24, FIG. 2. The relatively slight expansive axial movement of the cylinder 58 is indicated in phantom lines in FIG. 3, as where this cylinder is responding to an increase in temperature in the bay chamber 12b.

The thermally sensitive cylinders 58 and 60 are conventional devices and a manufacturing source for the cylinders is Dalen Products, Inc., 201 Sherlake Drive, Knoxville, Tenn. 37922. Other equivalent thermally sensitive actuator devices can be employed. The Dalen cylinder is disclosed in U.S. Pat. No. 4,155,504.

The base of damper directional cylinder 58 is attached to a bracket 66 fixed to the bottom wall 68 of chamber 12b. This cylinder may sense the outside ambient temperature due to its proximity to the vent slots 14. The temperature at which the cylinder 58 expands depends upon the particular type of window insulation, but a typical expansion initiation temperature is in the range of 60°-65° F. The damper directional cylinder 58 transmits motion to the damper actuator cylinder 60 through a hard link 70 having one end fixed to cylinder section 58b and having its opposite end attached at 72 to an offset or eccentric mount 74. Damper actuator cylinder 60 is supported by a bracket 76 fixed to a side wall of bay 12 whereby the cylinder 60 can rotate about an axis 78, FIGS. 3 and 4, when damper directional cylinder 58 extends or expands axially. Actuator cylinder 60 has a yoke 80 and a pin 82 fixed to its extendable section 60b. Pin 82 passes through an opening 84 in a cam lever 86. The cam lever 86 is rotatably held in a fixed bracket 88 attached to the side wall of bay 12 through a pivot pin 90, and maintained centered relative to bracket 88 by a centering spring 92.

The other end of cam lever 86 away from the opening 84 is attached via a slot and pin 94 to a dual leg damper lever 96 which is fixed on a rocker shaft 98 of the damper 26b. One leg of dual leg damper lever 96, FIG. 4, is attached at 100 to a push rod 102 which extends to a damper lever 104 fixed on the rocker shaft 106 of damper 26a through a connecting shaft 108, FIG. 4.

The proximity of damper actuator cylinder 60 to opening 62 enables the cylinder 60 to sense the prevailing temperature in plenum 24. The temperature at which the cylinder 60 will be extended depends upon the type of installation, but a typical temperature range which will initiate extension or expansion of cylinder 60 is 85°-90° F.

Damper actuator cylinder 60 transmits its motion to cam lever 86 rotating it either clockwise or counterclockwise on its pivot 90 depending upon the position of damper directional cylinder 58. Counterclockwise rotation of cam lever 86 will, through levers 96 and 104 and rod 102, move dampers 26a and 26b to their inside air flow positions 34a-34b, FIG. 2. Similarly, clockwise rotation of cam lever 86 will move dampers 26a and 26b to their outside air flow positions 36a-36b, FIG. 2.

In certain structures, such as office buildings, where the windows face south, the inside building air space often overheats on days with bright sun and low outside temperatures, due to sunlight heating through the windows. In such a situation the isolated bay chamber 12b instead of being placed in communication with outside ambient through the louver slots 14 is placed in communication with inside building ambient or air space temperature through the louver slots 14a, as shown in dotted lines in FIG. 3. Damper directional control cylinder 58 in such an arrangement is then exposed to and controlled by inside air temperature.

SUMMARY OF OPERATION

FIGS. 2, 3 and 4 show the window with the two cylinders 58 and 60 full retracted and the dampers 26a and 26b closing and sealing the solar plenum 24 which is now a dead air space. The damper directional cylinder 58 being exposed to outside ambient or inside building space air temperature, will be retracted whenever this temperature is typically below 60° F., FIG. 5. Damper actuation cylinder 60, being exposed to the temperature in plenum 24, will be retracted whenever this temperature is typically below 85° F., FIG. 3. Whenever the sun is shining, the temperature in the plenum 24 will be well above this temperature; therefore, the retracted condition of cylinder 60 will occur on cool overcast days or at night. On cool or winter days with the sun shining, directional cylinder 58 will remain retracted, when it is vented through louvers 14 to outside air, but actuation cylinder 60 will extend, FIG. 5. This extension will cause cam lever 86 to rotate counterclockwise, FIG. 5, moving dampers 26a, 26b to the inside air flow positions 34a, 34b, whereby inside air can circulate freely by natural convection through inlet 20, plenum 24 and outlet 22 to the inside building space, thus allowing air from the plenum 24 which has been heated by solar radiation with the assistance of screen 48 to enter and heat the inside building space.

On cool or winter days with the sun shining in building installations previously described, that have substantial glass facing south and thus have a tendency to overheat inside, directional cylinder 58 is vented to inside temperatures through louvers 14a, and will extend when inside air is greater than designed temperatures. This extension will rotate actuation cylinder 60 counterclockwise about pivot axis 78, and with damper actuation cylinder 60 extended due to high temperature in the plenum 24, the dampers will be in the outside air flow positions 36a, 36b, FIG. 6, to dissipate heat trapped in the plenum 24 to the outside atmosphere.

Figure 6:
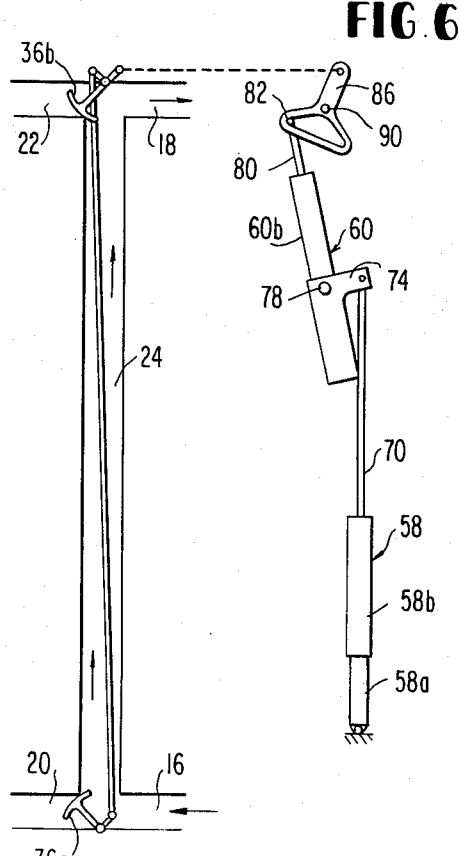

On warm days, above 65° F., with outside louvers 14, or when inside building space temperature is greater than designed building temperatures, with inside louvers 14a, damper directional cylinder 58 will extend, rotating actuation cylinder 60 counterclockwise, FIG. 6, about pivot axis 78, moving yoke 80 and pin 82 to the left side of cam lever 86. Centering spring 92 at this time maintains the position of cam lever 86.

When the sun heats up the solar screen 48 and hence the plenum 24, actuation cylinder 60 will extend and rotate cam lever 86 clockwise, FIG. 6, moving dampers 26a, 26b to their outside air flow positions 36a, 36b. Outside air can now flow through inlet 16 and plenum 24 and through outlet 18 in a continuous circuit, thus allowing heat trapped by the solar screen 48 in plenum 24 to be dissipated by dumping it to the outside atmosphere.

Figure 5:
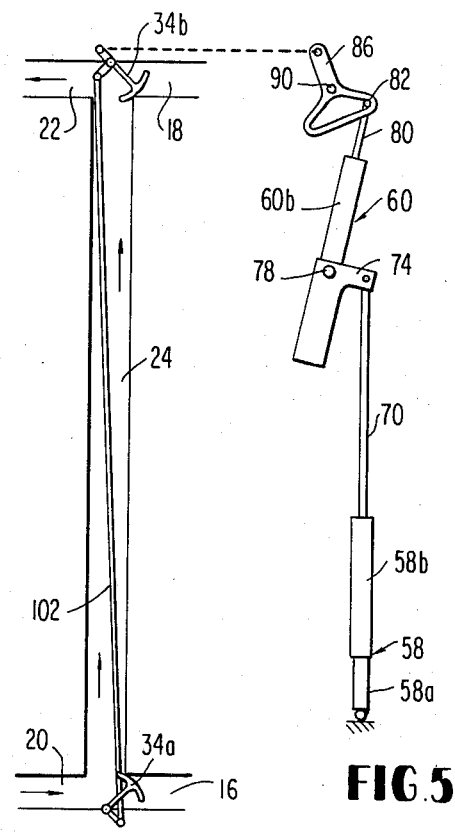
FIGS. 5 and 6 are diagrammatic views showing the operation of thermally sensitive window damper operating means.

A unique feature of the cam lever 86 is that it allows the dampers 26a and 26b to move directly from the inside flow position 34a, 34b, FIG. 5, to the outside flow position 36a, 36b, FIG. 6, or vice versa. For example, actuation cylinder 60 can extend rotating cam lever 86 counterclockwise, FIG. 5, thus rotating dampers 26a, 26b to their inside air flow positions 34a, 34b. Then, if directional cylinder 58 extends, due to a rise in the outside temperature, or a rise in inside building space temperature above designed temperatures, it would rotate actuation cylinder 60 causing cam lever 86 to rotate clockwise on its pivot 90 from its extreme counterclockwise position to its extreme clockwise position, thus rotating dampers 26a, 26b directly from the inside air flow position of FIG. 5 to the outside air flow position of FIG. 6.

It can be seen that the two cylinders each have two operative positions creating four combinations. The conditions which initiate the four positions of the two cylinders 58 and 60 and the corresponding damper positions explained above are as follows when cylinder 58 is controlled by outside ambient:

|  |  | Actuation Cyl. 60 | |
| --- | --- | --- | --- |
|  |  | Retracted | Extended |
| Direct. Cyl. 58 | Retr. | Temp: Out <60°, (24) <85° Cond: Night or Cloudy and Cool Dampers: Closed | Temp: Out <60°, (24) >90° Cond: Sunny and Cool Dampers: Inside Flow |
|  | Ext. | Temp: Out >65°, (24) <85° Cond: Night or Cloudy and Warm Dampers: Closed | Temp: Out >65°, (24) >90° Cond: Sunny and Warm Dampers: Outside Flow |

To remove the solar screen 48 for cleaning, the interior window 40 is removed and the leaf springs 56 are then compressed to allow removal of the rails 52 from their mounts 54 whereby the solar screen can be removed from the window.

Figure 7:
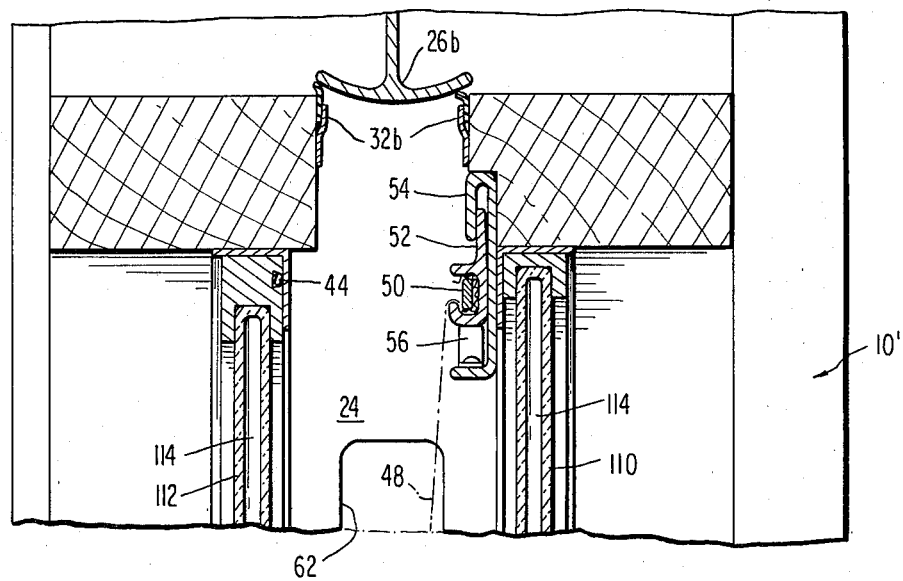
FIG. 7 is a fragmentary vertical section, similar to FIG. 2, according to a modification of the invention.

FIG. 7 of the drawings shows an alternate embodiment of the invention which is identical to the described embodiment except that the exterior and interior windows 38 and 40 are replaced by double pane windows 110 and 112, each having a closed internal space 114 which can be filled with an inert gas, such as $GN_2$ at least in the interior window 112. In the summer, when hot air from the plenum 24 is being dumped to the outside, this double pane window arrangement will insulate the space 24 from the air conditioned interior room space. In cold weather, the double pane arrangement will provide additional dead air spaces reducing heat losses.

In some cases, a manual override arrangement for the automatic dampers 26a, 26b can be provided. A suitable blower, not shown, can be utilized to promote movement of air through the plenum 24. In such cases, where electricity is used to power a blower, the dampers could be actuated by thermostat controlled solenoid actuators to maintain the desired room temperature.

A suitable plenum could be provided at the top of the window units to transport warm air from the solar plenum 24 into existing building ductwork.

The described window provides distinct advantages over the prior art at any time of the year, day or night, as follows:

Summer Day—Solar screen prevents 75% of solar energy from entering room interior. The 60% absorbed (15% reflected) is removed from vicinity of window reducing loss to interior via conduction through glass. This is further enhanced via a dual inner pane.

Summer Night—Dead air space created by closed dampers insulates, reducing loss of cooling. This is further enhanced via a dual inner pane.

Winter Day—Solar screen absorbs 60% of incident solar energy. This heats air in window unit which is circulated through interior room for heating when the direction cylinder 58 is controlled by outside ambient, but is dumped to the outside atmosphere when the direction cylinder is controlled by inside air temperature.

Winter Night—Dead air space created by closed dampers insulates, reducing loss of heating. This is further enhanced via a dual inner pane. Solar screen reduces radiant energy loss from warm interior objects.

The structure of the invention is very versatile. For instance, inside window panel 40 may be a double hung window which can be raised and lowered to provide air circulation to the inside in lieu of providing inside air inlet 20 and inside air outlet 22, and outside storm window panel 38 may be regular storm window panel with the dampers 26a and 26b arranged at the bottom and the top of the storm window panel to vent the plenum 24 formed between the double hung window and the storm window only to the outside atmosphere. The pair of dampers at the opposite ends of the plenum 24 in such an arrangement are movable between a closed position in which the opposite ends of the plenum 24 are sealed, and an open position in which the opposite ends of the plenum are placed in communication with the outside atmosphere. The damper actuator 60 in such an installation is immovably connected in the position shown in FIG. 6 and is in communication with the temperature in the plenum 24. No damper direction control cylinder 58 is required in such an arrangement and it is for this reason that damper actuator cylinder 60 is immovably connected in the position shown in FIG. 6 so as to rotate cam lever 86, or a lever similar thereto, from a position as shown in FIG. 3 when it is in retracted position and the dampers are sealing opposite ends of the plenum 24, clockwise to the position shown in FIG. 6 where the dampers open opposite ends of the plenum in communication with the outside atmosphere. This simplier and more economical construction may also be incorporated into a window unit for office buildings and the like, which have an inside window panel 40 and an outside storm window panel 38 similar to those as illustrated in the drawings with only air passages 16 and 18 to the outside and without the air passages 20 and 22 to the inside, whereby the dampers 26a and 26b controlled only by a damper actuator 60 are movable between positions closing the opposite ends of the plenum 24 as shown in FIG. 2 to positions such as 36a and 36b opening opposite ends of the plenum to the outside atmosphere to dump the hot air in the plenum to the outside.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A window having a solar plenum and having outside and inside air passages adapted for communication with the solar plenum, and thermally sensitive means operable to close the solar plenum to create a dead air space and to place said plenum in communication with the outside or the inside air passages responsive to temperature differentials in the outside or inside air and in said solar plenum, and said thermally sensitive means having communication with the outside or inside air and with the solar plenum, and said thermally sensitive means comprising a pair of dampers forming movable closures for the solar plenum, and actuating linage means adjacent to the window and being drivingly connected to said dampers, and said linkage means including a pair of independent actuators sensitive to temperature changes and being arranged in two separate chambers, one of said actuators being arranged in one of said chambers adjacent to and separated from the solar plenum, said one chamber having aperture means in communications with the outside or inside air, and the other of said actuators arranged in the solar plenum.

2. A window as defined in claim 1, and solar shading means within said plenum.

3. A window as defined in claim 2, and said shading means comprising a solar screen element spanning said plenum.

4. A window as defined in claim 1, and spaced outside and inside window panels defining opposite side walls of said solar plenum.

5. A window as defined in claim 4, and said spaced outside and inside window panels each comprising a double pane window panel having a dead air space.

6. A window having a solar plenum and having outside and inside air passages adapted for communication with the solar plenum, and thermally sensitive means operable to close the solar plenum to create a dead air space and to place said plenum in communication with the outside or the inside air passages responsive to temperature differentials in the outside or inside air and in said solar plenum, said thermally sensitive means having communication with the outside or inside air and with the solar plenum, and said thermally sensitive means comprising a pair of dampers forming movable closures for opposite ends of the solar plenum, and an actuating linkage adjacent to the window and being drivingly connected to said dampers, and said linkage including a pair of independent actuators sensitive to temperature changes and being arranged in two separated chambers, one chamber being in communication with the outside or inside air and the other chamber being in communication with the solar plenum.

7. A window as defined in claim 6, and said independent actuators comprising a pair of extensible cylinders coupled in said actuating linkage and containing a temperature sensitive material which upon heating causes extension of the cylinders.

8. A window as defined in claim 7, and each cylinder including a biasing means urging the cylinder to a retracted condition.

9. A window as defined in claim 8, and said actuating linkage including a link interconnecting said dampers whereby they are caused to move in unison by said linkage relative to the solar plenum.

10. A window as defined in claim 8, and means rockably supporting one cylinder in relation to the other cylinder, and lost motion camming means in the actuating linkage connected with the rockably supported cylinder and located between such cylinder and said dampers.

11. A window as defined in claim 10, and the rockably supported cylinder being in communication with said solar plenum, the other cylinder being in communication with outside or inside air.

12. A window as defined in claim 11, and a hard link between said means rockably supporting one cylinder and the other cylinder, said other cylinder comprising a directional cylinder for said dampers and the rockably supported cylinder comprising an actuation cylinder for said dampers.

13. A pair of side-by-side window units each having a solar plenum and each having outside and inside air passages adapted for communication with the respective solar plenum, a bay between said side-by-side window units, chamber means in said bay in communication with the solar plenum of each window unit and with the outside or inside air, thermally sensitive means located in said chamber means and being common to said window units, and said thermally sensitive means operable to simultaneously close the solar plenum of each window unit to create a dead air space and to place each plenum in communication with the respective outside or the inside air passages responsive to temperature differentials in the outside or inside air and in the solar plenums, said thermally sensitive means comprising said bay between said side-by-side window units having a pair of separated chambers one of which chambers has open communication with the solar plenums of the window units and the other of which has open communication with the outside or inside air, movable dampers disposed at opposite ends of the solar plenums of said window units, and mechanism to move said dampers in unison disposed within said bay and including independently operable thermally sensitive actuator units disposed in said separated chambers.

* * * * *